United States Patent [19]

Shigaki

[11] Patent Number: 4,693,596
[45] Date of Patent: Sep. 15, 1987

[54] METHOD OF DETERMINING EXPOSURES

[75] Inventor: Takao Shigaki, Kanagawa, Japan

[73] Assignee: Fuji Photo Film Co., Ltd., Kanagawa, Japan

[21] Appl. No.: 857,627

[22] Filed: Apr. 30, 1986

[30] Foreign Application Priority Data

Feb. 12, 1986 [JP] Japan .................................. 61-28554

[51] Int. Cl.$^4$ ............................................. G03B 27/32
[52] U.S. Cl. ...................................... 355/77; 355/38; 355/68
[58] Field of Search ............................. 355/38, 68, 77; 356/222

[56] References Cited

U.S. PATENT DOCUMENTS 3,708,676 1/1973 Huboi et al. ...................... 355/38 X
4,017,179 4/1977 Pone, Jr. et al. ................. 355/38 X Primary Examiner—Richard A. Wintercorn
Attorney, Agent, or Firm—Young & Thompson

[57] ABSTRACT

In a method of determining printing exposures, an original image to be printed is divided into at least two image extents, namely, a principal subject and a background, from each of which at least one image characteristic value is obtained based on the color densities thereof. On the basis of the obtained image characteristic values the proper exposure is determined for obtaining prints of proper densities. The proper exposure is performed by basic exposure control in which the basic exposure is obtained from the image characteristic value, or its artificially weighted value, of the principal subject image extent, and by color correction whose amount is determined either from the characteristic value of the background image extent or from the characteristic values of the both image extents.

11 Claims, 7 Drawing Figures

1

METHOD OF DETERMINING EXPOSURES

BACKGROUND OF THE INVENTION

The present invention relates to a method of determining exposures in printing.

In making positive prints on photographic paper from originals such as negatives, positives or the like, it is usual to determine the exposure in accordance with the average density over the whole area of the original to be printed.

Generally, originals include a background image besides the image of a principal subject matter (which is referred to hereinafter as the principal subject image) intended to be photographed. In the above exposure determination, the density measurement is conducted over the whole area of the original to be printed, namely, effected independently of the principal subject image thereof, with the result that the obtained prints are not always satisfactory because the principal subject image is printed with improper density.

In color printing, as is well known in the art, the determination of exposure is based on the large area transmittance densities of red, green and blue of the color original to be printed, and the proportions of the three primary color components of printing light are controlled.

In order to solve the above-described problem, a printing method has been proposed in, for example, Japanese Patent Publ. No. 55-29412 wherein an original is divided into a plurality of image sections, one of them being selected as the principal subject image. The selected image section is scanned to measure its densities at a number of points (each of which represents a picture element) thereof in order to calculate at least one characteristic value of density from the measured densities. On the basis of the characteristic density value and the average density over the whole area of the original, the printing exposure is determined. In this printing method, however, it is hard to control exposures with a high accuracy, since there is given no useful information for obtaining prints of proper tint both as to the characteristic density value of the principal image and as to the average density over the whole area of the original image: because of the inclusion of the principal subject image in the whole area of the original image, the information as to density cannot distingush between the densities of the principal subject image and its background image.

In conventional printing methods including the above-described one, the average density of the whole area of the originals is in fact used to obtain prints of proper tint. On the other hand, the empirical rule that the openair subject matter of originals generally has a color close to gray is applicable to the background image thereof. But if the principal subject image of the originals has an intended tint, the empirical rule will be often inapplicable.

SUMMARY OF THE INVENTION

Accordingly, the primary object of the present invention is to provide a printing method for determining exposures with a high accuracy.

In accordance with the present invention the original is separated into two areas of principal subject image and its background image. Each image area is measured to obtain its characteristic image value in order to calculate the printing exposure on the basis of the characteristic image values of the original.

The principal subject image area can be determined by directly bordering an area of the original by means such as a light pen, a touch panel, a cursor. Alternatively, the principal subject image area can be determined on the basis of information on the part of the original image which is selected through visual analysis, or, otherwise automatically determined by a computer without using such supplemental information. The principal subject image area may be either spatially continuous or discontinuous. The background image area can be determined in the same way as for the principal subject image area. It is permissible to divide the whole image of the original either entirely or partially into two parts comprising the principal subject and background image areas.

For each image area thus determined, various kinds of characteristic valaues of density are calculated in order to obtain the printing exposure. For the calculation, it is permissible to calculate the amount of color correction and an essential printing exposure independently from each other, and otherwise the printing exposure may be calculated according to a single exposure formula. In the event of the latter, color filters are adjusted on the basis of the resulting exposure and, if these are insufficient for the needed color correction, a shutter is controlled to vary the exposure time in steps from a standard exposure time.

DETAILED DESCRIPTION OF THE INVENTION

Figure 1:
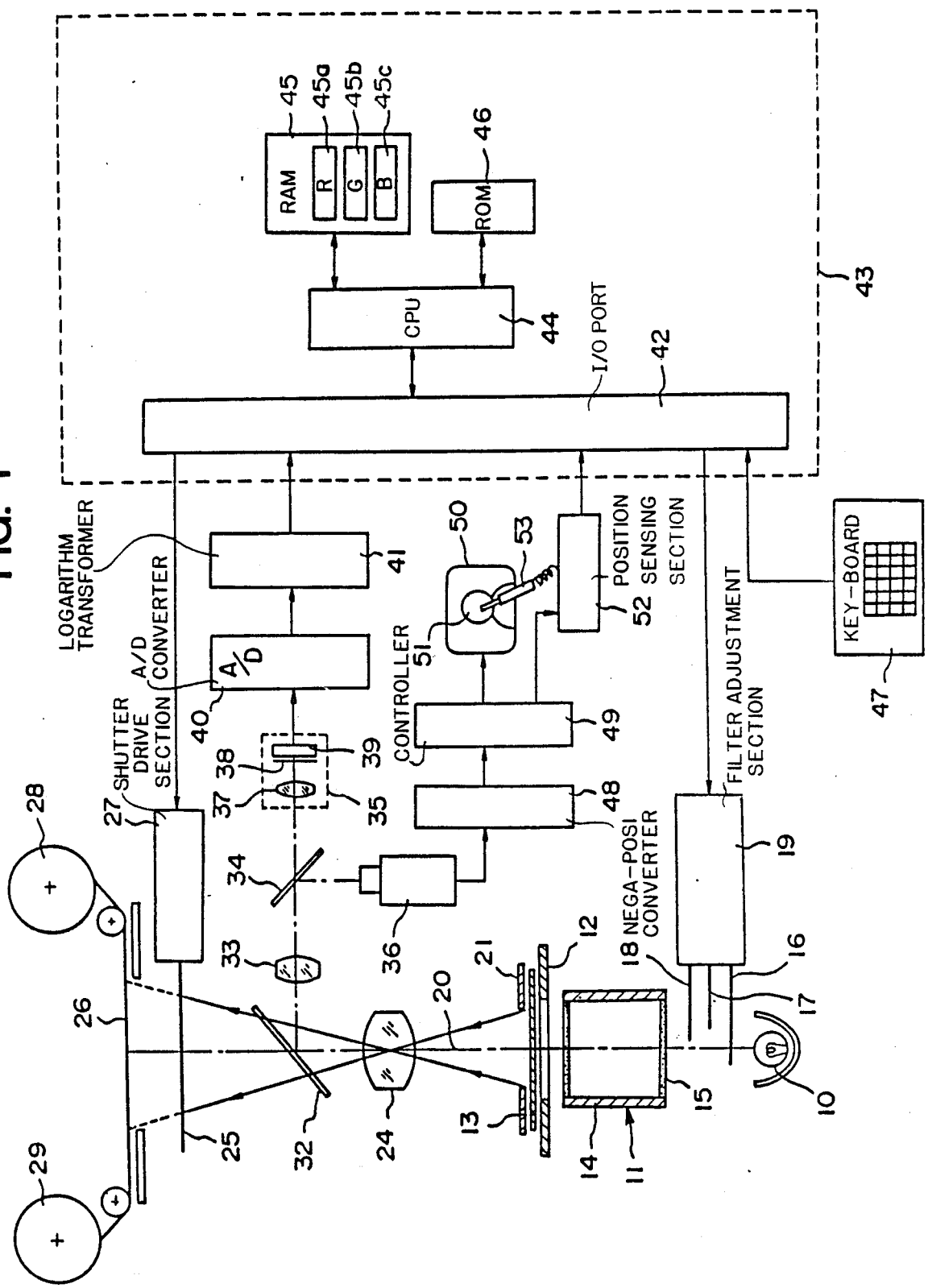
FIG. 1 is a schematic view of a printer to which the present invention is applied.

Referring now to FIG. 1 showing a color printer with which a method for determining exposures according to the present invention is used, there are three complementary color filters 16, 17, 18, namely cyan, magenta and yellow. Each color filter 16, 17, 18 is controllably insertable independently of the other two between an illumination lamp 10 and a diffusion box 11 which comprises a square hollow tube 14 having inner mirrored walls and top and bottom diffusion plates 15. The white light from the lamp 10 passes through the control filter 16, 17 or 18 into the diffusion box 11 and is diffused thereby. The diffused light, after passing through a color original or color negative 13 placed between a negative carrier 12 and a mask member 21 so as to be held flat in an exposure position, if focussed on a color paper 26 by means of the enlarging lens 24 to create a latent image of the color original 13 under the control of a shutter 25 which is controlled by a shutter control 27 to open for a certain time, providing a standardized exposure time. After exposure, the color paper 26 is wound up on a take-up reel and an unexposed part thereof is withdrawn from a supply reel 29 to be placed in the exposure position.

In the optical path 20 of the illumination light, a half-mirror 32 is disposed inclined by, for example in this embodiment, 45° to reflect the illumination light and then to direct it to another half-mirror 34, the light is divided into two beams, namely the light reflected toward a color TV camera 36 and the light transmitted to a sensor unit 35 comprising a lens 37, a color filter 38 and an image sensor 39. The lens 33 in front of the half-mirror 34 focuses the image of the color original 13 on the image sensor 39. From this sensor unit 35, color signals of red, green and blue can be extracted either independently by color or mixed for each picture element of the image of the color original. For example, in this embodiment, a single image sensor which is contributive to decreasing the cost of the color printer is used to detect the three color signals of the image for 25×25 picture elements (measuring points) thereof. It is of course permissible to replace the single image sensor by three image sensors for red, green and blue.

The respective color signals from the sensor unit 35, specifically from the image sensor 39, are transferred to an A/D converter 40 and converted thereby into digital signals which are, after being logarithmically transformed into corresponding color density signals by a logarithmic transformer 41, transferred into a microcomputer 43 through 1/0 port 42 thereof. This microcomputer 43 is well known per se and comprises the 1/0 port 42, a CPU 44, a RAM 45 and a ROM 46, so as to control the operations of components as well as to calculate exposures, as will be described later. The color density signals thus transferred are separated by color and stored in respective frame memories 45a, 45b, 45c. A keyboard 47 is provided to instruct the respective components to operate under the control of the microcomputer 43.

The color TV camera 36 picks up the color negative image of the color original 13 and produces video signals. These video signals from the color TV camera 36 are transferred to a posi-nega converter 48 to be converted into positive video signals. The positive video signals thus converted are then transferred through a controller 49 to a color monitor 50 in order to display the positive image 51 on its screen. The controller 49 is adapted to produce, based on synchronizing signals, position signals which in turn are sent to a position detecting section 52.

On the other hand, an operator visually observes the positive image 51 on the screen of the monitor 50 and specifies the boundary of the positive image 51 which is considered to be a principal subject image from visual analysis. The operater touches the boundary of the principal subject image with a position-specifying means, for example, a light pen 53. This light pen 53, as is well known per se in the art, is adapted to receive light from the screen of the monitor 50 when the corresponding part of the monitor lights and to photoelectrically convert the received light into a signal which in turn is sent to a position-detecting section 52. As a result, position information which represents the position of the specified part on the color monitor 50 touched by the light pen 53 is given to the microcomputer 43.

As the position specifying means, it is possible to replace the light pen 53 by touch panel sensor, joysticks, digitizers, track-balls or X-Y cursors. In addition, it is practicable to use a spot light illuminator turning on and off or a LCD panel of which a part can dim out so as to illuminate a part of the color original 13. The difference in transmitted light through a particular part of the color original 13 between the two illuminated conditions is detected by the image sensor unit 35 to detect the position of the particular part. In addition, it is possible to illuminate a spot on a principal subject image to detect the density of the spot to be compared with the base density of the color negative and then to find a picture element whose density is lower than the base density. When specifying a single point of the color original, it is advantageous to detect automatically parts having colors identical or similar to the color of the specified single point and to determine the extend defining a principal subject image according to the identical and similar color parts.

Figure 2:
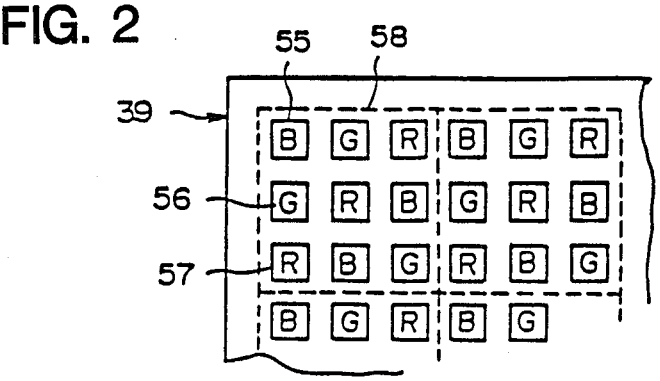
FIG. 2 is an explanatory illustration of an image sensor used in the printer of FIG. 1.

Reference is now had to FIG. 2 showing by way of example the image sensor 39 used in the image sensor unit 35 of FIG. 1. The image sensor 39 is comprised of a large number of photoelectric conversion elements 55, 56, 57 of the three primary colors, namely, blue, green and red which are regularly arranged in a certain order to form a matrix. Each photoelectric conversion element has a filter of corresponding color on its light-receiving surface, as is well known in the art. The photoelectric conversion elements are grouped in matrices, each of which includes three photoelectric conversion elements both per column and per row to form a single color signal detector 58 for each picture element of the color negative image projected onto the image sensor 39. In FIG. 2, the respective single color signal detectors 58 are shown in dotted line.

When extracting color signals, color signals from photoelectric conversion elements in a single picture element are extracted additively by color, or else are extracted mixed and then added by color in the microcomputer 43, and stored in the RAM 45. In this example, it is advantageous that photoelectric conversion elements for the same colors are properly distributed in a single color signal detector 58 to eliminate the occurrence of color registration to a considerable extend. It suffices in this image sensor 39 to arrange the color signal detectors 58, approximately 25 both per column and per row. For simplicity, it is desirable to form each color signal detector consisting of three photoelectric conversion elements arranged either in a single rank or file, or at the vertices of a triangle.

Figure 3:
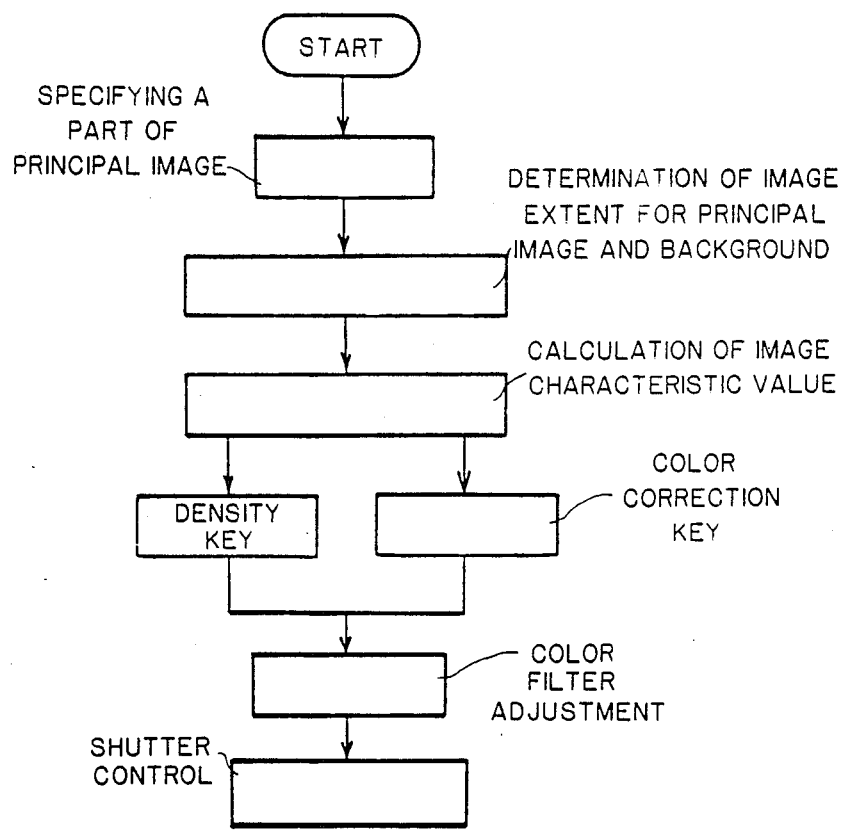
FIG. 3 is a flow chart showing a sequence of exposure control.

FIG. 3 shows a sequency of exposure control with reference to which the operation of the color printer of FIG. 1 will be explained.

The color original or negative 13 is moved by means of a transfer mechanism (not shown) to position a picture frame to be printed between the negative carrier 12 and the mask member 13. At this time, each color filter 16, 17, 18 is retracted from the illumination light path 20 so as to allow a part of the white light from the lamp 10 to pass into the diffusion box 11 and to be diffused thereby. The diffused light, after passing through the negative 13 and the enlarging lens 24, reaches the half-mirror 32. The transmitted part of the light is focussed on the color paper 26 and, on the other hand, the reflected part of the light is directed to the other half-mirror 34 after passing through the lens 33. The half-mirror 34 divides the light incident thereto into two beams, the transmitted light being directed toward the sensor unit 35 and the reflected light toward the color TV camera 36.

The sensor unit 35 scans a color negative image focussed on the image sensor 39 therein to measure each picture element of the negative image so as to detect the red, green and blue components of light and then to provide color signals of red, green and blue for each picture element. The color signals are converted into color densities after an A/D conversion and a logarithmic transformation and then stored in the RAM 45 of the microcomputer 43, separately by color. On the other hand, the color TV camera 36 provides video signals of the negative image which are, after a negative-positive transformation, transferred to the color monitor 50 through the controller 49 so as to display the positive image of the color original 13 on its screen. The extend of a part of the positive image which is recognized through visual observation to be a part of a principal subject image is specified by use of the light pen 53. The position information of the specified extent of the principal specified extent is detected in the position detecting section 52 and the subject image is input into the microcomputer 43.

Figure 4:
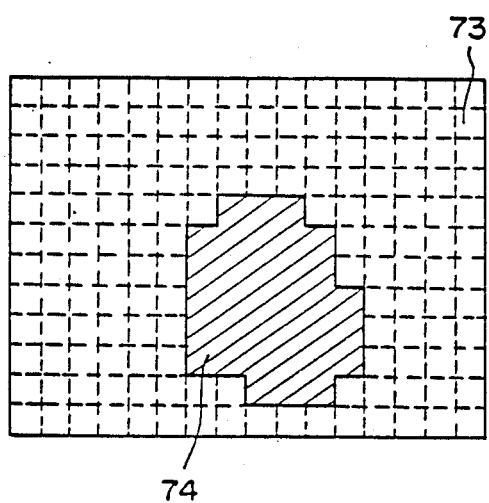
FIG. 4 is an explanatory illustration of an example of an image area table.

In the microcomputer 43, the extents of the principal subject and the background image are determined based on the position information from the position detecting section 52. The results of this image extent determination are written in an image extent table of the RAM 45. In FIG. 4, showing the image extent table corresponding to the negative image, each picture element 73 shown in dotted line is measured by use of a single color signal detector 58 shown in FIG. 2. The part 74 which is shaded in FIG. 4 is determined to be the extent defining a principal subject image 76 and the remaining part excluded from the principal subject image 76 is determined to be a background image.

Figure 5:
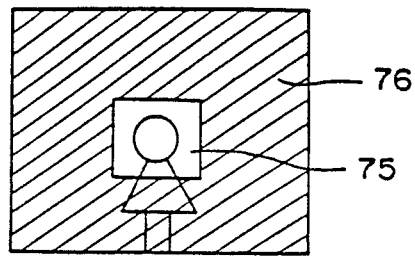
FIGS. 5(A), (B) and (C) are explanatory illustrations of different background image areas.
Figure 5:
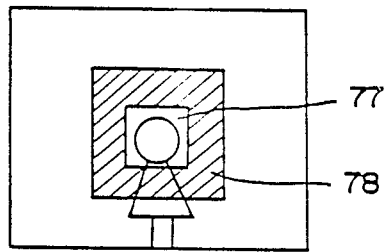
Figure 5:
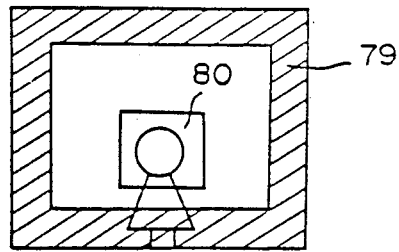

The above-described background image extent is shown by way of example in FIGS. 5(A), (B) and (C).

The background image extent is defined by the remaining area 76 being shaded except for the principal image extent 75 in FIG. 5(A), by a shaded area 78 around the principal image extent 77 in FIG. 5(B), or by a shaded frame 79 apart the principal image extent 80 in FIG. 5(C).

An image characteristic value which is peculiar to the individual image extent is then calculated to obtain the amount of color correction (Ci) and the standard exposure (Di), respectively, by using the following formulas:

$$Ci = ai + biR^S + ciG^S + diB^S, \text{ and}$$

$$Di = ei + fiR^P + giG^P + hiB^P,$$

wherein
i is one of red (R), green (G) and blue (B),
$R^S$, $G^S$, and $B^S$ are mean color densities of R, G and B of the background image extent,
$R^P$, $G^P$ and $B^P$ are mean color densities of R, G and B of the principal image extent,
ai–hi are constants.

The mean color density is the value which is obtained either as an arithmetic mean value resulting from the sum of color density values of all the picture elements divided by the number of the picture elements or as a medium value between the maximum and the minimum density value.

Then, the exposure is calculated from the following formula:

$$Di = \alpha i Di + \alpha i Ci,$$

wherein i is one of red, green and blue, and $\alpha i$ and $\beta i$ are constants.

Based on the resulting exposure thus obtained, the filter adjusting section 19 adjusts the amount of insertion of each complementary color filter 16, 17, 18 so as to move into or out of the optical path 20 in steps. As a result, thr proportion of the three color components of the printing light is controlled. When the corrections of color balance and of color density by the filters 16 to 18 are insufficient, the shutter 25 is controlled by the shutter control 27 so as to increase or decrease the exposure time in accordance with the resulting exposure obtained as described above.

Upon operating a print key of the keyboard 47, the shutter 25 opens for a predetermined time to allow the proper exposure of the color paper 26 to create a latent image. After the completion of the exposure, the color paper 26 and the color negative 13 are transported by one frame, respectively, and each color filter 16, 17, 18 is caused to return to its standardized position in the optical path.

Because, in the above-described embodiment, the exposure control is performed based on the exposures calculated by use of the formulas using the image characteristic values both of the principal subject image extent and of the background image extent, it is possible to make prints of desirable color balance and density from negatives of ordinary scenes. That is, since the color correction is effected based on the mean color density of the background image extent, it is easy to gray-balance in accordance with the empirical rule that the average density of originals of the ordinary open-air subject matter is close to gray. In addition, since the basic exposure is calculated based on the mean density of the principal subject image extent, it is possible to reproduce the desired images of proper density independently of the background images.

In the case of the negatives whose scenes include a large area of skin, the following formulas are used to control properly exposures for making desirable prints. These formulas use the mean color density of the principal image extent to calculate the amount of color correction (Ci) and the basic exposure (Di).

$$Ci = ai + biR^P + ciG^P + diB^P$$

and $$Di = ei + fiR^P + giG^P + hiB^P$$

The reason of using the formulas is that, because of the inclusion of skin color in the extent of the principal image (whose color is memorized), it is possible to reproduce the tint of the whole image area of the print in good conditions, by reproducing the principal subject image of proper tint.

In addition, it is usually possible to calculate the amount of color correction and the exposure based on characteristic density values of the extents of the principal subject and the background image, which values are separately weighted. In this case, it may be advantageous to vary the weighting coefficient according to the scenes of the negatives.

While in the above embodiment the exposure of each color (red, green and blue) is controlled by varying the quality of the light in accordance with the degree of insertion of the color filters into the optical path, it is also permissible to dispose cut-filters of cyan, magenta and yellow in the optical path, respectively, when the calculated exposure for each color is given to the color paper.

Although the description has been directed to a printing apparatus to which the present invention is applied, it is to be understood that the present invention is applicable also to apparatus for examining negatives and to apparatus for printing or examining black and white originals.

What is claimed is:

1. A method of determining exposures when printing on a medium from an original, which comprises:
   determining two image extents comprising a principal subject and a background on said original by selectively separating the original into a principal subject area and a background area;
   obtaining at least one image characteristic value for each said image extent by measuring the density value of each of a plurality of points on said original; and
   calculating the exposure based on said image characteristic values.

2. A method as defined in claim 1, and using said image characteristic values to determine the amount of color correction and the basic exposure time of said medium.

3. A method as defined in claim 1, and calculating a basic exposure based on said image characteristic value of said principal subject image, and calculating the amount of color correction based on said image characteristic values of said principal subject and background images.

4. A method as defined in claim 1, and calculating a basic exposure of said medium based on said image characteristic value of said principal subject image and calculating an amount of color correction based on said image characteristic value of said background image.

5. A method as defined in claim 1, and performing said obtaining of at least one image characteristic value and said calculation of the exposure for each color of red, green and blue.

6. A method as defined in claim 5, and controlling the exposure of said medium on which said original is to be reproduced on the basis of said calculated exposure for each color.

7. A method as defined in claim 6, wherein said exposure control consists of projecting printing light through said original and onto said medium, disposing adjustable color filters in the path of said printing light, and controlling the position of said filters and the duration of the exposure of said medium to said light responsive to the determination of said image characteristic values.

8. A method of photographic printing from an original which comprises:
   dividing the image of said original into two image extents comprising a principal subject and a background by selectively separating the original into a principal subject area and a background area;
   obtaining at least one image characteristic value for each said image extent;
   calculating the exposure based on said image characteristic values;
   projecting printing light through said original and onto a medium of which said color original is to be printed;
   disposing adjustable filters in the path of said printing light; and
   controlling the position of said filters and the duration of the exposure of said medium to said light responsive to the determination of said image characteristic values.

9. A method as claimed in claim 8, wherein said obtaining, said calculating, said disposing, and said controlling are performed for each color of red, green and blue corresponding to a color of said image of the original.

10. A method as defined in claim 1, wherein said determining of two image extents is accomplished by using means to border the principal subject area of an image of the original on a monitor screen.

11. A method as defined in claim 1, wherein said determining of two image extents is accomplished by selectively illuminating a portion of said original.

* * * * *